(12) United States Patent
Sarkar et al.

(10) Patent No.: US 11,774,571 B2
(45) Date of Patent: Oct. 3, 2023

(54) METHOD AND SYSTEM FOR NAVIGATING AUTONOMOUS GROUND VEHICLE USING RADIO SIGNAL AND VISION SENSOR

(71) Applicant: Wipro Limited, Bangalore (IN)

(72) Inventors: Manas Sarkar, Barasat (IN); Balaji Sunil Kumar, Bengaluru (IN)

(73) Assignee: Wipro Limited, Bangalore (IN)

( * ) Notice: Subject to any disclaimer, the term of this patent is extended or adjusted under 35 U.S.C. 154(b) by 421 days.

(21) Appl. No.: 16/794,448

(22) Filed: Feb. 19, 2020

(65) Prior Publication Data

US 2021/0199786 A1    Jul. 1, 2021

(30) Foreign Application Priority Data

Dec. 30, 2019   (IN) .............................. 201941054407

(51) Int. Cl.
| | |
|---|---|
| *G01S 13/06* | (2006.01) |
| *G01S 13/46* | (2006.01) |
| *G05D 1/02* | (2020.01) |
| *G06V 20/56* | (2022.01) |

(52) U.S. Cl.
CPC .............. *G01S 13/46* (2013.01); *G05D 1/028* (2013.01); *G05D 1/0212* (2013.01); *G05D 1/0248* (2013.01); *G06V 20/588* (2022.01); *G01S 2013/466* (2013.01)

(58) Field of Classification Search
CPC .... G05D 1/0212; G05D 1/0248; G05D 1/028; G05D 2201/0213; G05D 1/0246; G01S 13/46; G01S 2013/466; G01S 13/74; G01S 17/86; G01S 17/931; G06V 20/588; G06V 20/56
See application file for complete search history.

(56) References Cited

U.S. PATENT DOCUMENTS

| | | | | |
|---|---|---|---|---|
| 3,928,840 | A * | 12/1975 | Spindel | G01S 11/14 367/125 |
| 9,885,773 | B2 | 2/2018 | Hehn et al. | |
| 2016/0349362 | A1* | 12/2016 | Rohr | G01S 13/86 |
| 2020/0159238 | A1* | 5/2020 | Jacobsen | G05D 1/028 |
| 2020/0257301 | A1* | 8/2020 | Weiser | G06N 3/02 |
| 2021/0078580 | A1* | 3/2021 | Mangal | G06V 20/588 |

* cited by examiner

*Primary Examiner* — Jess Whittington
(74) *Attorney, Agent, or Firm* — Finnegan, Henderson, Farabow, Garrett & Dunner, LLP (57) ABSTRACT

The present invention discloses a method and a system for navigating an Autonomous Ground Vehicle (AGV) using a radio signal and a vision sensor. The method comprising generating a trajectory plan for a short distance from a path plan, wherein the path plan is determined using destination location and AVG location, identifying an approximate AGV location using a radio signal-based trilateration mechanism, estimating AGV location error with respect to a road lane center by determining distance from the approximate AGV location to road boundary and road lane marking line and orientation difference between AGV orientation and road orientation, and correcting the trajectory plan by using the estimated AGV location error for navigating an AGV.

15 Claims, 6 Drawing Sheets

METHOD AND SYSTEM FOR NAVIGATING AUTONOMOUS GROUND VEHICLE USING RADIO SIGNAL AND VISION SENSOR

TECHNICAL FIELD

The present subject matter is generally related to Autonomous Ground Vehicle (AGV), more particularly, but not exclusively, to a method and a system for navigating an AGV using a radio signal and a vision sensor.

BACKGROUND

An AGV is a vehicle that operates autonomously on ground without any involvement of an onboard human. Typically, several on-vehicle sensors along with Global Positioning System (GPS) help the AGV to navigate through a route. However, in a deserted route, surrounding may look very similar over a good span of time. In such situations, environment matching based localization using visual sensor may lack in terms of correctness. Also, preparing a High Definition (HD) map of a forest, a desert, a mining route, or a port route is difficult as these maps lack in accuracy. Overall any conventional localization method for the vehicle to determine its location on a journey continuously in the above-mentioned scenarios become a challenging problem.

The information disclosed in this background of the disclosure section is for enhancement of understanding of the general background of the invention and should not be taken as an acknowledgement or any form of suggestion that this information forms the prior art already known to a person skilled in the art.

SUMMARY

In an embodiment, the present disclosure may relate to a method for navigating an AGV using a radio signal and a vision sensor. The method includes generating a trajectory plan for a short distance from a path plan, wherein the path plan is determined using destination location and AVG location, identifying an approximate AGV location using a radio signal-based trilateration mechanism, estimating AGV location error with respect to a road lane center by determining distance from the approximate AGV location to road boundary and road lane marking line and orientation difference between AGV orientation and road orientation, and correcting the trajectory plan by using the estimated AGV location error for navigating an AGV.

In an embodiment, the present disclosure may relate to an AGV assistance system for navigating an AGV using a radio signal and a vision sensor. The AGV assistance system may include a processor and a memory communicatively coupled to the processor, wherein the memory stores processor-executable instructions, which on execution, cause the processor to generate a trajectory plan for a short distance from a path plan, wherein the path plan is determined using destination location and AVG location, identify an approximate AGV location using a radio signal-based trilateration mechanism, estimate AGV location error with respect to a road lane center by determining distance from the approximate AGV location to road boundary and road lane marking line and orientation difference between AGV orientation and road orientation, and correct the trajectory plan by using the estimated AGV position error for navigating an AGV.

In an embodiment, the present disclosure may relate to a non-transitory computer readable medium including instructions stored thereon that when processed by at least one processor cause an Autonomous Ground Vehicle (AGV) assistance system to perform operations comprising generating a trajectory plan for a short distance from a path plan, wherein the path plan is determined using destination location and Autonomous Ground Vehicle (AGV) location, identifying an approximate AGV location using a radio signal-based trilateration mechanism, estimating AGV location error with respect to a road lane center by determining distance from the approximate AGV location to road boundary and road lane marking line and orientation difference between AGV orientation and road orientation, and correcting the trajectory plan by using the estimated AGV location error for navigating an AGV.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described below, by way of example only, and with reference to the accompanying figures.

It should be appreciated by those skilled in the art that any block diagrams herein represent conceptual views of illustrative systems embodying the principles of the present subject matter. Similarly, it will be appreciated that any flowcharts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Embodiments of the present disclosure provide a solution for navigating an AGV using a radio signal and a vision sensor. The embodiments of the present disclosure overcome the need of high-resolution 3D map for localization and at the same time, provides a near correct localization method to navigate the AGV on a desired route. The solution involves using radio signal-based trilateration method to determine a location of the AGV with some error. For radio signal-based trilateration method, radio transceivers or transponders are placed in a specific arrangement along a desired route. By using closest three known transponder location at any point of time, approximate vehicle location is determined. Subsequently, using vision sensor data obtained from on-board camera and Light Detection And Ranging (LIDAR) sensor on the AGV, the approximate vehicle location is corrected to obtain near correct vehicle location for navigation.

Figure 1:
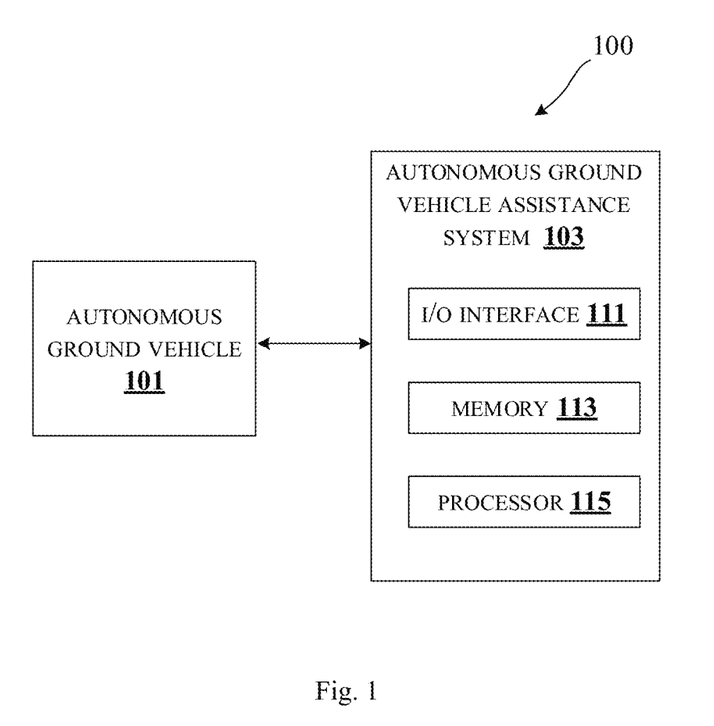
FIG. 1 illustrates an exemplary environment for navigating an AGV using radio signal and vision sensor in accordance with some embodiments of the present disclosure.

FIG. 1 illustrates an exemplary environment for navigating an AGV using a radio signal and a vision sensor in accordance with some embodiments of the present disclosure.

As shown in the FIG. 1, the environment 100 includes an AGV 101 and an AGV assistance system 103. The AGV 101 may be connected to the AGV assistance system 103 via a direct interconnection. In an embodiment, the AGV 101 may be connected to the AGV assistance system 103 via a communication network (not shown in FIG. 1). A person skilled in the art would understand that, the communication network, not mentioned explicitly, may refer to any communication network to connect the AGV 101 to the AGV assistance system 103. Here, the AGV may refer to any autonomous vehicle. The AGV 101 may provide data that may include destination location and AVG location and sensor data to the AGV assistance system 103. The sensor data may be captured using camera and LIDAR sensor attached on the AGV 101. In return, the AGV 101 may receive AGV location error from the AGV assistance system 103 to correct trajectory plan for navigating the AGV 101. The communication network 105 may include, but is not limited to, wireless network (for example, using Wireless Application Protocol), Internet, Wi-Fi, Bluetooth and the like.

In the embodiment, the AGV assistance system 103 may identify an approximate AGV location and thereafter, may estimate AGV location error for navigating the AGV 101. The AGV assistance system 103 may include an I/O interface 111, a memory 113 and a processor 115. The I/O interface 111 may be configured to receive the path plan data and the sensor data from the AGV 101. Analogously, the I/O interface 111 may be configured to communicate with the AGV 101 to provide AVG location error for correcting trajectory plan. The I/O interface 111 may employ communication protocols/methods such as, without limitation, audio, analog, digital, monoaural, Radio Corporation of America (RCA) connector, stereo, IEEE-1394 high speed serial bus, serial bus, Universal Serial Bus (USB), infrared, Personal System/2 (PS/2) port, Bayonet Neill-Concelman (BNC) connector, coaxial, component, composite, Digital Visual Interface (DVI), High-Definition Multimedia Interface (HDMI), Radio Frequency (RF) antennas, S-Video, Video Graphics Array (VGA), IEEE 802.11b/g/n/x, Bluetooth, cellular e.g., Code-Division Multiple Access (CDMA), High-Speed Packet Access (HSPA+), Global System for Mobile communications (GSM), Long-Term Evolution (LTE), Worldwide interoperability for Microwave access (WiMax), or the like.

The path plan data and the sensor data received by the I/O interface 111 may be stored in the memory 113. The memory 113 may be communicatively coupled to the processor 115 of the AGV assistance system 103. The memory 113 may, also, store processor instructions which may cause the processor 115 to execute the instructions for navigating the AGV 101. The memory 113 may include, without limitation, memory drives, removable disc drives, etc. The memory drives may further include a drum, magnetic disc drive, magneto-optical drive, optical drive, Redundant Array of Independent Discs (RAID), solid-state memory devices, solid-state drives, etc.

The processor 115 may include at least one data processor for navigating the AGV 101. The processor 115 may include specialized processing units such as integrated system (bus) controllers, memory management control units, floating point units, graphics processing units, digital signal processing units, etc.

Figure 2:
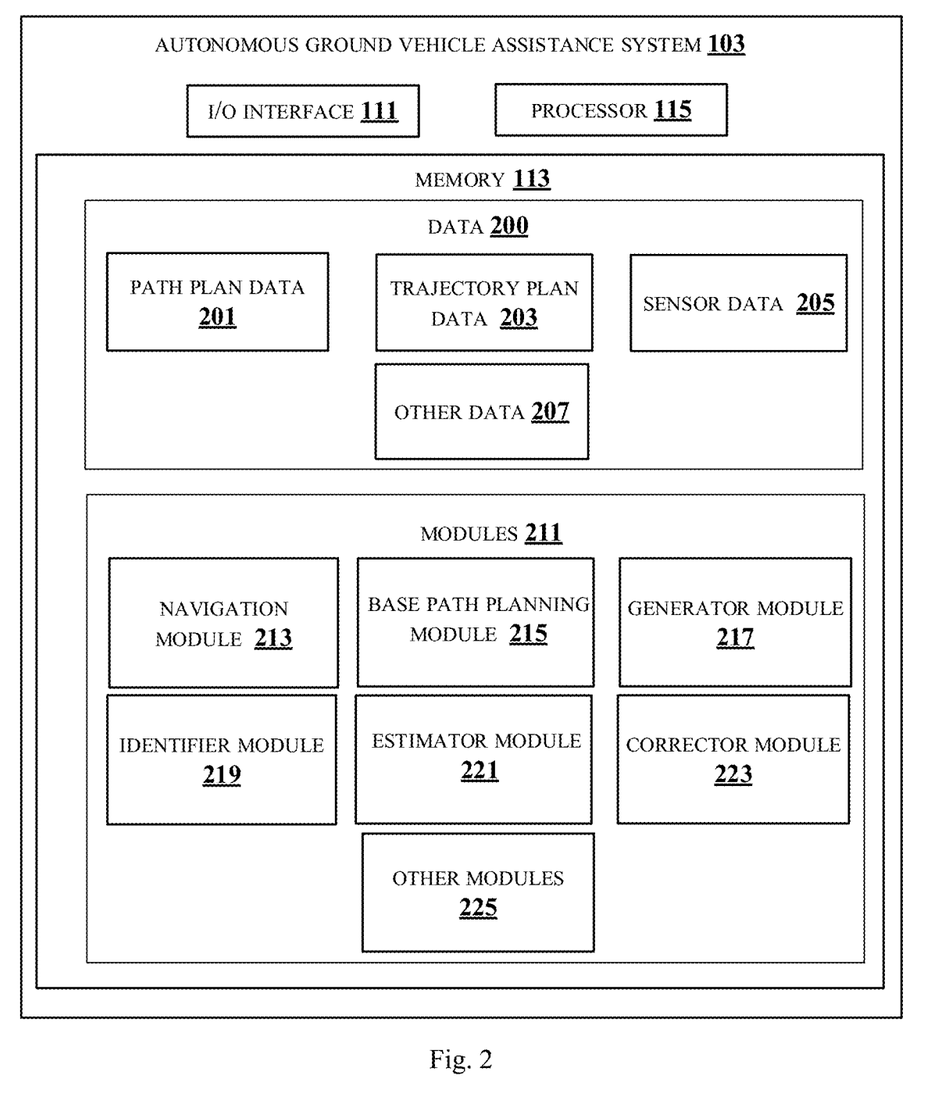
FIG. 2 shows a detailed block diagram of an AGV assistance system in accordance with some embodiments of the present disclosure.

FIG. 2 shows a detailed block diagram of an AGV assistance system in accordance with some embodiments of the present disclosure.

The AGV assistance system 103, in addition to the I/O interface 111 and processor 115 described above, may include data 200 and one or more modules 211, which are described herein in detail. In the embodiment, the data 200 may be stored within the memory 113. The data 200 may include, for example, path plan data 201, trajectory plan data 203, sensor data 205 and other data 207.

The path plan data 201 may include destination location and AVG location for determining a path plan. The destination location and the AVG location are received by the AGV assistance system 103 from the AGV 101 and stored in the path plan data 201.

The trajectory plan 203 may include sensor data from current environment and AGV current velocity for determining a trajectory plan. The sensor data from current environment and the AGV current velocity are received by the AGV assistance system 103 from the AGV 101 and stored in the trajectory plan data 203. The sensor data from current environment may be collected by several on-vehicle sensors attached to the AGV 101.

The sensor data 205 may include data collected by camera and LIDAR sensors for determining an AGV location error. The sensor data from the camera and LIDAR sensors are received by the AGV assistance system 103 from the AGV 101 and stored in the sensor data 205. The camera and LIDAR sensors attached to the AGV 101 may collect the sensor data 205.

The other data 207 may store data, including temporary data and temporary files, generated by modules 211 for performing the various functions of the AGV assistance system 103.

In the embodiment, the data 200 in the memory 113 are processed by the one or more modules 211 present within the memory 113 of the AGV assistance system 103. In the embodiment, the one or more modules 211 may be implemented as dedicated hardware units. As used herein, the term module refers to an Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality. In some implementations, the one or more modules 211 may be communicatively coupled to the processor 115 for performing one or more functions of the AGV assistance system 103. The said modules 211 when configured with the functionality defined in the present disclosure will result in a novel hardware.

In one implementation, the one or more modules 211 may include, but are not limited to, a navigation module 213, a base path planning module 215, a generator module 217, an identifier module 219, an estimator module 221 and a corrector module 223. The one or more modules 211 may, also, include other modules 225 to perform various miscellaneous functionalities of the AGV assistance system 103.

The navigation module 213 may be receive destination point that a user may want to travel. The navigation module 213 may be connected to a user interface in the AGV 101 via I/O interface 111 of the AGV assistance system 103. A map may be displayed to a user on the user interface in the AGV 101. In that map, the user may be able to see current location of the AGV 101, which may, also, be referred to as source location of the AGV 101. The user may touch the map to choose a destination point. Once the destination point is selected, the navigation module 213 may initiate navigation process from path planning to velocity generation to autonomously drive the AGV 101 from the source location to the destination point.

The base path planning module 215 may produce a path plan based on the source location and the destination point. The base path planning module 215 may use a lane waypoint based planner algorithm to determine the path plan. The lane waypoint based planner algorithm may comprise of Dijkstra, A* or any other path planning algorithm on a 2D occupancy grid map.

The generator module 217 may, also, be referred as Trajectory Planning and Velocity Generation Module (TPnVGM). The generator module 213 may generate a trajectory plan for a short distance from the path plan produced by the base path planning module 215. The trajectory plan may be a local path plan within a field of view of the AGV, which may be approximately 10-15 meters ahead or in front of the AGV 101. The trajectory plan may be generated based on sensor data from current environment and AGV current velocity. Furthermore, the generator module 217 may generate a realistic velocity based on a previous moment velocity and projected velocity as per the trajectory plan. This realistic velocity generation may happen in certain frequency, for instance at every 100 ms, and may be applied to the AGV 101.

Figure 3:
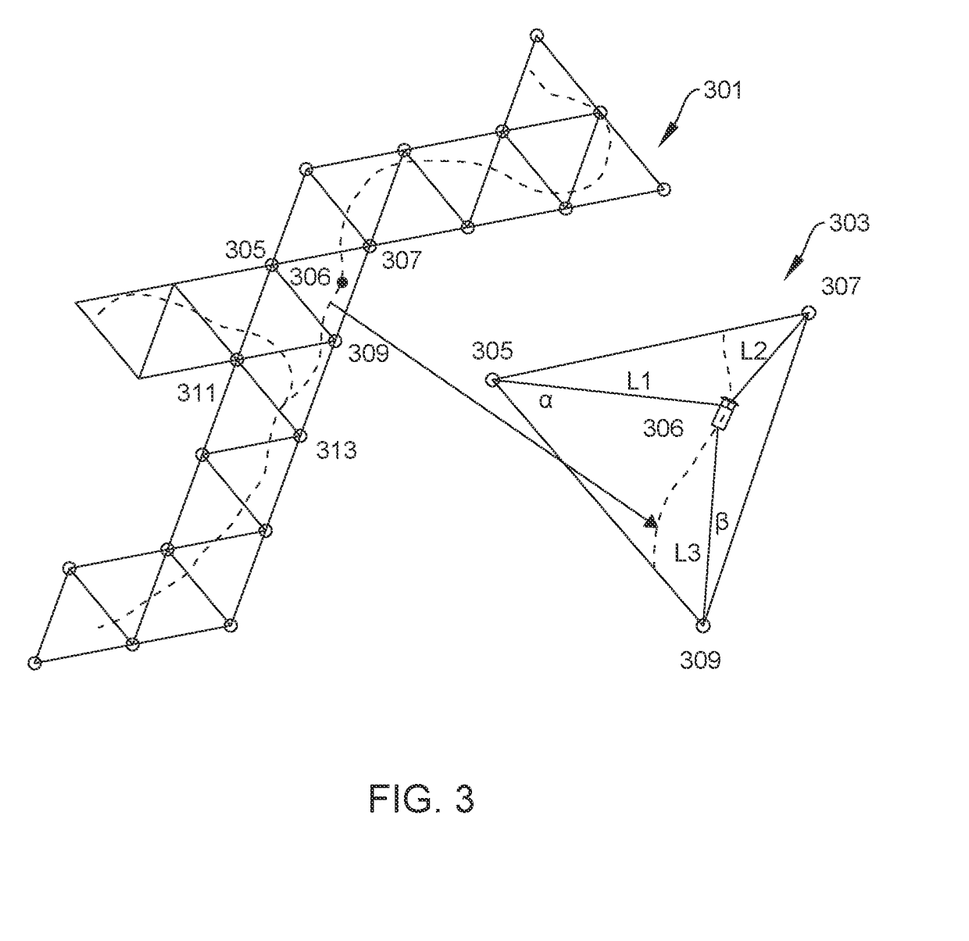
FIG. 3 illustrates a localization estimation method using a radio signal-based trilateration to identify an approximate AGV location in accordance with some embodiments of present disclosure.

The identifier module 219 may, also, be referred as Localization Estimation by Radio signal-based Trilateration (LEwRT) module. The identifier module 219 may identify an approximate AGV location using a radio signal-based trilateration mechanism. The localization estimation method using a radio signal-based trilateration to identify an approximate AGV location is explained below with reference to 301 and 303. For the radio signal-based trilateration mechanism to work, radio signal transceiver or transponder may be pre-installed at specific locations of forest, mining area, shipping ports and desert. Typically, the above-mentioned vast area or region which may not be easily be covered by conventional vision based localization used for navigating the AGV 101 due to similarity of continuous visuals. The use of radio signal transponders is to avoid covering the whole area or region, thereby, reducing infrastructure cost and allowing efficient usage of resources. The radio signal transponders may be arranged such that at any point in time there are three radio signal transponders forming an equilateral triangle coverage zone for the AVG 101 movement for any of its position on the mentioned route. The three radio signal transponders together may cover any AGV that may fall within its boundary. The radio signal transponders may be placed such that a portion of road that falls within its boundaries may get covered. The radio signal transponders may be placed on specific location on a kilometre range approximately i.e. 1 to 1.5 km separation from each other, so that they can cover the whole route by three unilaterally separated transponder at any moment. With reference to 301, radio signal transponders 305, 307 and 309 form an equilateral triangular zone of coverage covering portion of a path or a road. Similarly, radio signal transponders 309, 311 and 313 form another equilateral triangular zone of coverage covering different portion of the path. When the AGV 101 passes through one of the two zone of coverage, three transponders from that particular zone of coverage are used to determine AGV location. Radio signal from the transponders are capable of penetrating any obstacles between the radio signal transponders and the AGV 101. The AGV 101 may send radio signal and receive responses back from nearby transponders. Distance is measured from vehicle to many radio signal transponders with whom radio signal exchange happen. In measuring the distance, the three radio signal transponders with shortest possible distance from the AGV 101 forming an equilateral triangular zone of coverage may be used in trilateration method. For example, consider reference 303 that shows that the AGV 101 at location 306. The AGV 101 may send and receive signal back from the radio signal transponders 305, 307, 309, 311 and 313. However, the three transponders 305, 307 and 309 form the shortest possible distance L1, L2 and L3, respectively, from the AGV 101 and hence, these three transponders are considered for determining approximate location of the AGV 101. As the AGV 101 moves along the road, three radio signal transponders may be selected for the radio signal-based trilateration mechanism depending on new location of the AGV 101. So, at any moment of journey, the AGV 101 may be under the supervision of three transponders.

Figure 4A:
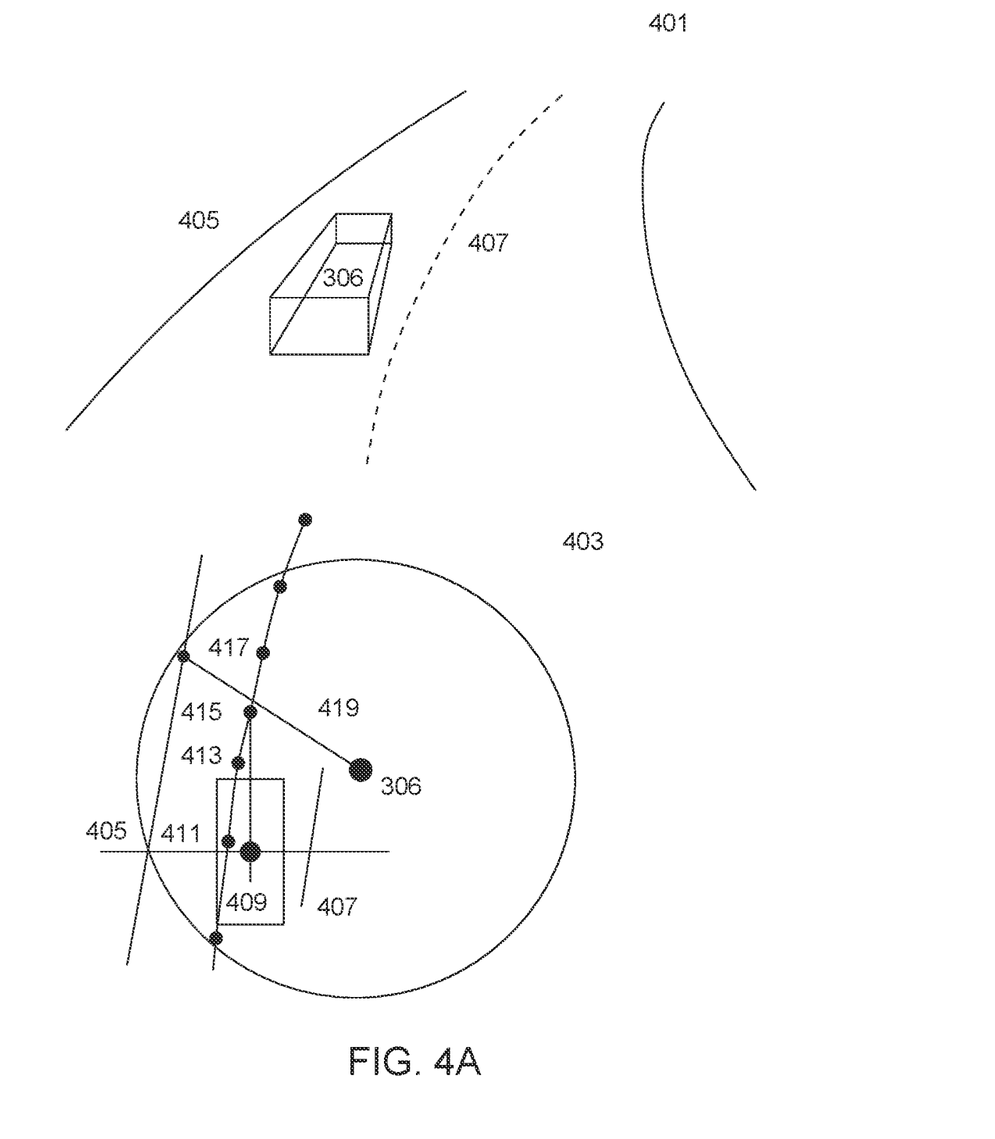
FIG. 4a-FIG. 4b illustrates vision based AGV position error correction method for navigating an AGV in accordance with some embodiments of present disclosure.
Figure 4B:
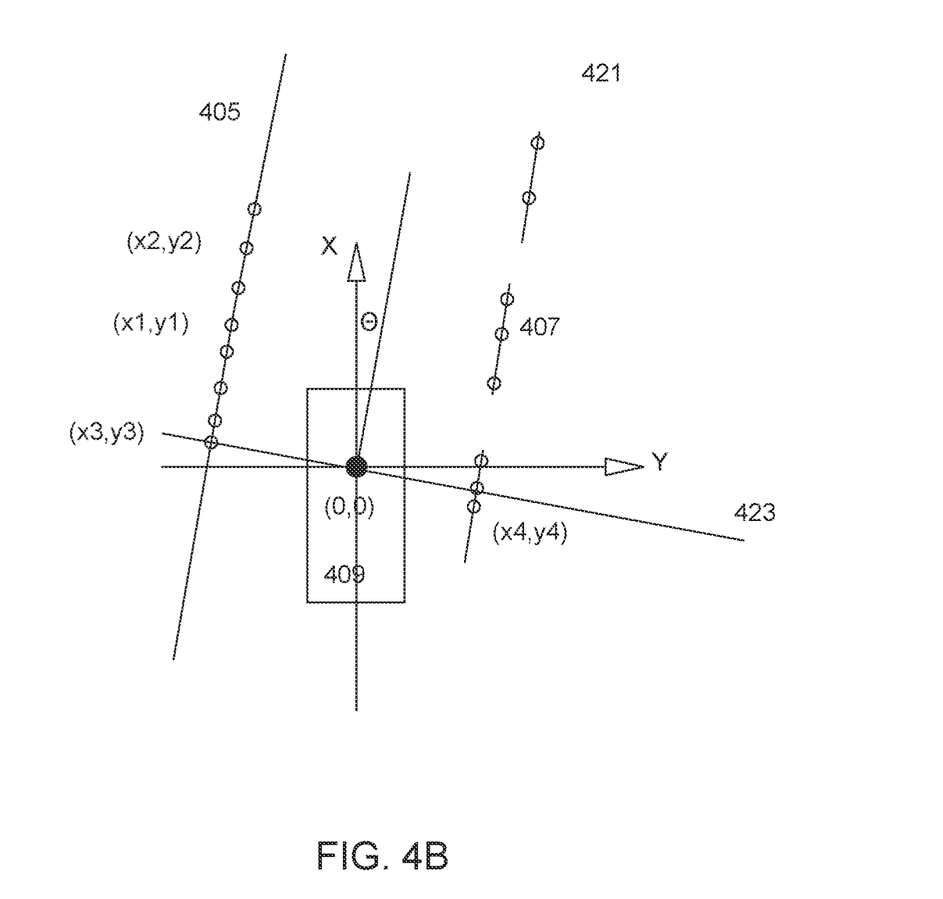

The estimator module 221 may, also, be referred as Vision based orientation Correction module (VbLCM). The estimator module 221 may estimate AGV location error with respect to a road lane center by determining distance from the approximate AGV location received from the identifier module 219 to road boundary and road lane marking line, and orientation difference between AGV orientation and road orientation. The vision based AGV position error correction method for navigating the AGV 101 is explained below with reference to 401, 403 and 421. The reference point 306 may refer to the approximate AGV location identified by the identifier module 219 previously. The approximate distance of reference point 306 from a road boundary 405 is given by the reference 419. The imaginary dotted circle represents an approximate area covered under the reference 419 when considered as a radius of the imaginary dotted circle. The imaginary dotted circle may be referred as a pre-determined search boundary. It may be seen in 403 of FIG. 4a that the approximate AGV location 306 is different from the actual location of the AGV 101 shown as 409. The approximate AGV location 306 may be stored for a period of time. The estimator module 221 may overcome this difference in the location of the AGV 101 by fine tuning the approximate AGV location 306 using camera and LIDAR sensor data. When the AGV 101 is on road shown as reference numeral 306, the camera attached to the AGV 101 may determine lane waypoints nearest to the AGV 101 based on AGV's direction of journey within 10 m. The lane waypoints are shown as 411, 413, 415 and 417 in FIG. 4b. Here, the lane waypoints are searched in the pre-determined search boundary. Once the lane waypoints are determined, one of the lane waypoints may be chosen as AGV's 1st level corrected location. In the next step, the presence of camera and LIDAR sensors on the AGV 101 may help to determine road boundary coordinates and center road lane marking coordinates in front of the AGV 101. Here, the road boundary is shown as reference numeral 405 and the center road lane marking is shown as reference numeral 407. The images captured using camera may be used to determine distinct difference in the road boundary 405 and also, the center road lane marking 407. Subsequently, LIDAR sensors may use reflection from the road boundary 405 and the center road lane marking 407 to determine respective coordinates. For example, these coordinates are shown as (x3, y3), (x1, y1) and (x2, y2) relating to the road boundary 405 and (x4, y4) relating to the center road lane marking 407 in FIG. 4b. The estimator module 221 may use the coordinates, for instance, (x1, y1) and (x2, y2) to determine the orientation difference between the AGV 101 and the road boundary 405. The equation may be given as following:

$$\tan(\Theta)=m=(y2-y1)/(x2-x1)$$

Where $\Theta$ is the orientation difference between the AGV 101 and road boundary 405. If x1 is equal to x2 in the above equation, then the AGV 101 is considered to be running parallel to the road boundary 405 and there is no misalignment or orientation difference. Once the orientation difference is determined, the distance of the AGV 101 may be determined with respect to the road boundary 405 and the centre road lane marking 407. For determining the road boundary distance, the estimator module 221 may assume the AGV 101 center at (0,0) and an imaginary perpendicular line 423, which will have inverse slope of 'm', passing through (0,0) to the coordinates (x3, y3) on the road boundary 405 in case there may be a misalignment or orientation difference ($\Theta$). The distance between the AGV 101 and road boundary 405 may be given by the following equation:

$$Db=\text{sqrt}(x3^2+y3^2)$$

Similarly, the distance between the AGV 101 and the center road lane marking 407 may be given by the following equation:

$$Dc=\text{sqrt}(x4^2+y4^2)$$

Similarly, the distance between the AGV 101 and the centre road lane marking 407 may be given by the following equation:

$$D_c=\text{sqrt}(x4^2+y4^2)$$

The corrector module 223 may correct the trajectory plan by using the estimated AGV location error received from the estimator module 221 to fine tune the AGV 101 location. The corrected trajectory plan may be used for navigating the AGV 101. The corrector module 223 may determine new lane waypoint using $D_b$, $D_c$ and determined lane waypoints received from the estimator module 221. The equation for the new lane waypoint may as following:

$$W_{pc}=f_p(D_b,D_c,W_{px})$$

Where 'x' of $W_{px}$ may be any of 0, 1, 2, 3 . . . or so on as the determined lane waypoints. $f_p$ indicates function. So, $W_{pc}$ is a function of three variable i.e. $D_b$, $D_c$ and $W_{px}$.

Now, the AGV 101 location error corrected pose may be determined as $W_{pc}=f_p(D_b, D_c, W_{px})$ and orientation difference $(\Theta)=f_0(O_r, O_v)$, where $O_v$ is an AGV orientation and $O_r$ is a road orientation. The individual values of $O_v$ and $O_r$ are not relevant here, hence, measuring these individual values are not required as only the deviation (or difference) is needed.

Exemplary calculation of (x, y) value of $W_{pc}$ may be given as:

'x' i.e. point at perpendicular line connecting the reference point 411 and the reference point 413 at distance $(D_b-D_c)/2$, ('x' of $W_{px}$ are any of 0, 1, 2, 3 . . . ). 'y' is calculated by putting 'x' value into a perpendicular line equation. From the above calculations, the corrector module may determine new lane waypoint and subsequently, may determine new path and correct the trajectory plan using the new lane waypoint.

The above approach is fine for trajectory planning as long as '$(D_b-D_c)/2$' i.e. the shift from the road lane centre and the orientation differences are calculated properly.

Figure 5:
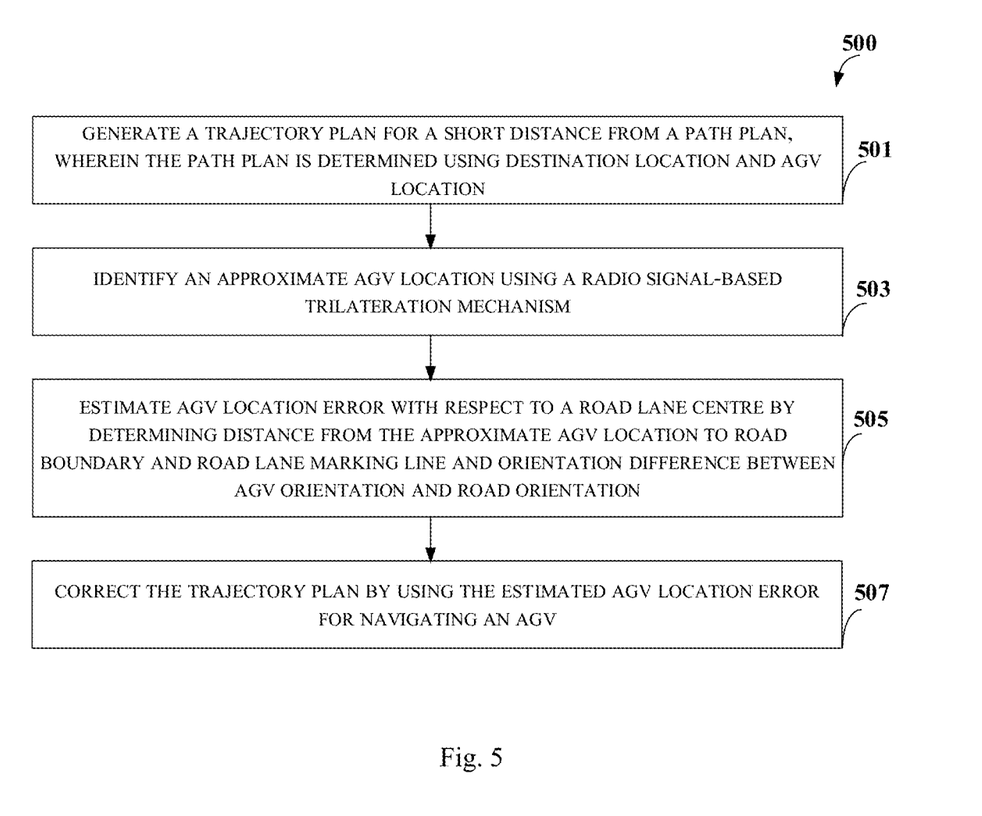
FIG. 5 illustrates a flowchart showing a method for navigating an AGV using radio signal and vision sensor in accordance with some embodiments of present disclosure.

FIG. 5 illustrates a flowchart showing a method for navigating an AGV using radio signal and vision sensor in accordance with some embodiments of present disclosure.

At block 505, the estimator module 221 may estimate AGV location error with respect to a road lane center by determining distance from the approximate AGV location to road boundary and road lane marking line, and orientation difference between AGV orientation and road orientation. The determining of distance from the approximate AGV location to road boundary and road lane marking line is performed using camera and LIDAR remote sensing method.

The order in which the method 500 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 501, the generator module 217 may generate a trajectory plan for a short distance from a path plan. The path plan is determined using destination location and AVG location. Further, the path plan is determined using a lane waypoint-based planner algorithm. The trajectory plan is a local path plan within a field of view of the AGV and is generated based on sensor data from current environment and AGV current velocity.

At block 503, the identifier module 219 may identify an approximate AGV location using a radio signal-based trilateration mechanism. The radio signal transponders required for the radio signal-based trilateration mechanism are pre-installed at specific locations. The specific locations may comprise of forest, mining area, shipping ports and desert.

At block 505, the estimator module 221 may estimate AGV location error with respect to a road lane centre by determining distance from the approximate AGV location to road boundary and road lane marking line, and orientation difference between AGV orientation and road orientation. The determining of distance from the approximate AGV location to road boundary and road lane marking line is performed using camera and LIDAR remote sensing method.

At block 507, the corrector module 223 may correct the trajectory plan by using the estimated AGV location error for navigating an AGV.

The steps involved at blocks 501 to 507 are repeated as the AVG 101 continues to navigate though the route from the source location to the destination point.

Some of the advantages of the present disclosure are listed below.

The present disclosure reduces the dependence on high resolution 3-dimensional map for AGV localization.

The present disclosure provides a near correct localization method that drives an AGV on specific locations that comprise of forest, mining area, shipping ports and desert.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, Programmable Gate Array (PGA), Application Specific Integrated Circuit (ASIC), etc.).

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 5 shows certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference number | Description |
| --- | --- |
| 100 | Environment |
| 101 | Autonomous ground vehicle |
| 103 | Autonomous ground vehicle assistance system |
| 111 | I/O interface |
| 113 | Memory |
| 115 | Processor |
| 200 | Data |
| 201 | Path plan data |
| 203 | Sensor data |
| 205 | Other data |
| 211 | Modules |
| 213 | Generator module |
| 215 | Identifier module |
| 217 | Estimator module |
| 219 | Corrector module |

-continued

| Reference number | Description |
| --- | --- |
| 221 | Other modules |
| 301 | Radio signal-based trilateration |
| 303 | Zoomed in portion of autonomous vehicle location |
| 306 | AGV location using radio signal-based trilateration |
| 401, 403, 421 | Vision based AGV position error correction |
| 405 | Road boundary |
| 407 | Road lane marking line |
| 411, 413, 415, 417 | Lane waypoints |

What is claimed is:

1. A method for navigating an Autonomous Ground Vehicle using a radio signal and a vision sensor, the method comprising:
generating, by an Autonomous Ground Vehicle (AGV) assistance system, a trajectory plan—from a path plan, wherein the path plan is determined using destination location and AGV location;
identifying, by the AGV assistance system, an approximate AGV location using a radio signal-based trilateration mechanism,
wherein the approximate AGV location is identified using radio signal transponders that are placed along a desired route such that a distance is measured between the AGV and the radio signal transponders based on radio signal exchange to determine three radio signal transponders with shortest possible distance from the AGV, at any point of time, forming an equilateral triangular zone of coverage;
determining, by the AGV assistance system, coordinates of road boundary and coordinates of center road lane marking in front of the AGV using camera and Light Detection And Ranging (LIDAR) sensors on the AGV;
determining, by the AGV assistance system, a difference between AGV orientation and road orientation based on the approximate AGV location, the coordinates of the road boundary, and the coordinates of the center road lane marking;
determining, by the AGV assistance system, a distance between the AGV and the road boundary and a distance between the AGV and the center road lane marking based on the approximate AGV location, the coordinates of the road boundary, and the coordinates of the center road lane marking;
estimating, by the AGV assistance system, AGV location error with respect to a road lane center based on a difference between AGV orientation and road orientation, a distance between the AGV and the road boundary, and a distance between the AGV and the center road lane marking;
determining, by the AGV assistance system, a new lane waypoint based on the distance between the AGV and the road boundary, the distance between the AGV and the center road lane marking, and lane waypoints associated with the AGV location error;
determining, by the AGV assistance system, AGV location error corrected pose based on the new lane waypoint; and
correcting, by the AGV assistance system, the trajectory plan-based on the AGV location error corrected pose.

2. The method as claimed in claim 1, wherein the path plan is determined using a lane waypoint based planner algorithm, and the trajectory plan is a local path plan within a field of view of the AGV.

3. The method as claimed in claim 1, wherein the radio signal transponders are pre-installed at specific locations.

4. The method as claimed in claim 1, wherein the distance between the AGV and the road boundary and the distance between the AGV and the center road lane marking is determined using the camera and the LIDAR sensors on the AGV.

5. The method as claimed in claim 1, wherein the trajectory plan is generated based on sensor data from current environment and AGV current velocity.

6. An Autonomous Ground Vehicle (AGV) assistance system for navigating an AGV using a radio signal and a vision sensor, the AGV assistance system comprising:
a processor; and
a memory communicatively coupled to the processor, wherein the memory stores processor-executable instructions, which on execution, cause the processor to:
generate a trajectory plan—from a path plan, wherein the path plan is determined using destination location and AGV location;
identify an approximate AGV location using a radio signal-based trilateration mechanism, wherein the approximate AGV location is identified using radio signal transponders that are placed along a desired route such that a distance is measured between the AGV and the radio signal transponders based on radio signal exchange to determine three radio signal transponders with shortest possible distance from the AGV, at any point of time, forming an equilateral triangular zone of coverage;
determine coordinates of road boundary and coordinates of center road lane marking in front of the AGV using camera and Light Detection And Ranging (LIDAR) sensors on the AGV;
determine a difference between AGV orientation and road orientation based on the approximate AGV location, the coordinates of the road boundary, and the coordinates of the center road lane marking;
determine a distance between the AGV and the road boundary and a distance between the AGV and the center road lane marking based on the approximate AGV location, the coordinates of the road boundary, and the coordinates of the center road lane marking;
estimate AGV location error with respect to a road lane center based on a difference between AGV orientation and road orientation, a distance between the AGV and the road boundary, and a distance between the AGV and the center road lane marking;
determine a new lane waypoint based on the distance between the AGV and the road boundary, the distance between the AGV and the center road lane marking, and lane waypoints associated with the AGV location error;
determine AGV location error corrected pose based on the new lane waypoint; and
correct the trajectory plan based on the AGV location error corrected pose.

7. The AGV assistance system as claimed in claim 6, wherein the path plan is determined using a lane waypoint based planner algorithm, and the trajectory plan is a local path plan within a field of view of the AGV.

8. The AGV assistance system as claimed in claim 6, wherein the radio signal transponders are pre-installed at specific locations.

9. The AGV assistance system as claimed in 6, wherein the distance between the AGV and the road boundary and the distance between the AGV and the center road lane marking is determined using the camera and the LIDAR sensors on the AGV.

10. The AGV assistance system as claimed in 6, wherein the trajectory plan is generated based on sensor data from current environment and AGV current velocity.

11. A non-transitory computer readable medium including instructions stored thereon that when processed by at least one processor cause an Autonomous Ground Vehicle (AGV) assistance system to perform operations comprising:
   generating a trajectory plan from a path plan, wherein the path plan is determined using destination location and AGV location;
   identifying an approximate AGV location using a radio signal-based trilateration mechanism, wherein the approximate AGV location is identified using radio signal transponders that are placed along a desired route such that a distance is measured between the AGV and the radio signal transponders based on radio signal exchange to determined three radio signal transponders with shortest possible distance from the AGV, at any point of time, forming an equilateral triangular zone of coverage;
   determining coordinates of road boundary and coordinates of center road lane marking in front of the AGV using camera and Light Detection And Ranging (LIDAR) sensors on the AGV;
   determining a difference between AGV orientation and road orientation based on the approximate AGV location, the coordinates of the road boundary, and the coordinates of the center road lane marking;
   determining a distance between the AGV and the road boundary and a distance between the AGV and the center road lane marking based on the approximate AGV location, the coordinates of the road boundary, and the coordinates of the center road lane marking;
   estimating AGV location error with respect to a road lane-center based on a difference between AGV orientation and road orientation, a distance between the AGV and the road boundary, and a distance between the AGV and the center road lane marking;
   determining a new lane waypoint based on the distance between the AGV and the road boundary, the distance between the AGV and the center road lane marking, and lane waypoints associated with the AGV location error;
   determining AGV location error corrected pose based on the new lane waypoint; and
   correcting the trajectory plan-based on the AGV location error corrected pose.

12. The medium as claimed in claim 11, wherein the path plan is determined using a lane waypoint based planner algorithm, and the trajectory plan is a local path plan within a field of view of the AGV.

13. The medium as claimed in claim 11, wherein the radio signal transponders are pre-installed at specific locations.

14. The medium as claimed in claim 11, wherein the distance between the AGV and the road boundary and the distance between the AGV and the center road lane marking is determined using the camera and the LIDAR sensors on the AGV.

15. The medium as claimed in claim 11, wherein the trajectory plan is generated based on sensor data from current environment and AGV current velocity.

* * * * *